2,953,449
IRON SOLUBILIZING PROCESS

Eli Seifter and Norman Phillips, Dayton, Ohio, assignors to Monsanto Chemical Company, St. Louis, Mo., a corporation of Delaware No Drawing. Filed Aug. 19, 1957, Ser. No. 679,078

6 Claims. (Cl. 71—1)

This invention relates to a process for solubilizing iron compounds or salts which are present in soils but which are otherwise unavailable to growing crops. The invention relates particularly to a process for the utilization of soil-bound iron salts as trace elements in plant nutrition by the treatment of the soil with 8-hydroxy quinoline-5-sulfonic acid and salts thereof.

An object of the invention is provide soil treating compositions for the more efficient utilization of soil-bound iron salts in order to render the iron content available as a trace element in plant nutrition. A further object of the invention is to provide compositions which are of utility in the treatment of soil in the fertilization thereof, while at the same time causing the soil-bound iron salts to become available by solubilizing such insoluble salts with a component of the fertilizer mixture.

A still further object is to improve soils by rendering the soil content thereof available to growing crops by reacting the same with 8-hydroxy quinoline-5-sulfonic acid or its salts such as the sodium, potassium and ammonium salts. The said compound may be applied directly to the soil; for example, in aqueous solution or dispersion which may be employed as a direct spray, or the said compound may be introduced in a fertilizer or other soil modifying composition such as a high molecular weight acrylic polymer applied to the soil in order to modify its properties.

The relative proportions in which the above-described 8-hydroxy quinoline-5-sulfonic acid compound is employed in order to solubilize soil-bound iron are from 2.5 to 50 pounds per acre in the crop row. These proportions of the said compounds may be employed by the direct application of such compounds, for example, an aqueous solution or dispersion. In the preparation of a dispersion, it is desirable to make use of typical detergent compounds such as alkyl aryl sulfonate salts as dispersing agents. It has been found that such solutions and dispersions are highly effective for this purpose and that such solutions release or solubilize up to four times as much iron as do typical commercial chelating compounds, for example, the di or tetra sodium salt of ethylene diamine tetra acetic acid. It has also been found that the present compounds are of greater utility than the prior art chelating compounds for the reason that the solubilized iron can now be provided as ferrous iron instead of the ferric compound, despite the fact that the normal iron compounds exist in the ferric condition in the soil as the result of oxidation by atmospheric oxygen and oxidizing agents which are present in the soil.

The solubilization of the soil-bound iron salts may also be carried out by providing the 8-hydroxy quinoline-5-sulfonic acid as a component of a fertilizer, for example, a typical commercial fertilizer which contains a nitrogen source such as ammonium sulfate together with a potash source such as potassium chloride and a phosphorous source such as ammonium phosphate. In order to supply the above proportions of from 2.5 to 50 pounds per acre of the 8-hydroxy quinoline-5-sulfonic acid per acre of soil, it is desirable that a commercial fertilizer contain from 0.1 percent to 1 percent by weight of the said compound.

In certain soils which are deficient in iron, but in which it would be futile to apply iron because of precipitation thereof in the soil, the present method of treatment may be modified by adding a soluble iron salt together with the above-described 8-hydroxy quinoline-5-sulfonic acid. The iron salt employed for this purpose may be any soluble iron salts such as ferric chloride, ferrous sulfate, ferric nitrate, etc. The proportion of the iron salt employed together with the above-described solubilizing agent is from 25 to 500 pounds of the iron salt per acre based upon the addition in the crop row, i.e., the addition is calculated only upon the direct area of application, disregarding the unused free space between the actual rows of growing crops, for example, corn, or fruit trees such as oranges. It is pointed out, however, that the addition of iron is not essential in all soils, but is to be employed only where a deficiency of iron exists. The characteristics of iron deficiency are well known, for example, in the chlorosis or yellowing of leaves of vegetable or fruit crop grown in such iron deficient soils. It is obvious that soils which contain insoluble iron but require only that the iron be made available can be treated directly with the 8-hydroxy quinoline-5-sulfonic acid without the necessity for adding iron salts.

The following examples illustrate specific embodiments of the present invention.

Example 1

Test plot of an alkaline clay salt and an acid sandy soil containing insoluble soil-bound iron were treated with various proportions of 8-hydroxy quinoline-5-sulfonic acid as an iron solubilizing agent. Comparison tests were also conducted in which the disodium salt of ethylene diamine tetra acetic acid was utilized in the same relationship. Certain tests also made use of added iron in order to show the solubilizing effect achieved by the present treating agents. The tests were conducted by applying an aqueous solution or dispersion of the treating agent by spraying the same upon the soil. Samples of the soil were then subjected to leaching with distilled water after which the iron content of the aqueous extracts was determined by conventional analytical methods. It was noted that the soluble iron thus released from the soil and made available as a trace element in soil nutrition existed to a considerable degree as the ferrous salt, even when the iron was provided as an additive material in the ferric condition, or was present in the soil as insoluble ferric salts. The following table summarizes the results obtained:

| Treatment | Amount Added (lb./acre) | Iron salts Extracted (lb./acre) |
|---|---|---|
| Disodium salt of ethylene diamine tetra-acetic acid | 200 | 0.8 |
| 8-hydroxy quinoline-5-sulfonic acid | 10 | 1.6 |

The above method of testing was also employed making use of an acid sandy soil. The results obtained are set forth below:

| Treatment | Amount Added (lb./acre) | Iron salts Extracted (lb./acre) |
|---|---|---|
| 8-hydroxy quinoline-5-sulfonic acid | 200 | 25 |
| Disodium salt of ethylene diamine tetra-acetic acid | 50 | 8 |
| plus $FeCl_3$ | 25 | |
| Disodium salt of ethylene diamine tetra-acetic acid | 200 | 2.4 |
| plus commercial chelating additive for Western acid soils | 200 | |

The above data indicated that the use of the present iron solubilizing components renders the soil-bound iron available for trace nutrition of plants because the insoluble forms of iron present in the soil are rendered soluble.

The above-described 8-hydroxy quinoline-5-sulfonic acid was also applied to soil in which various seeds had been planted. It was found in this pre-emergence test that the growth of the seedlings was not hindered by the presence of these iron solubilizing compounds. The pre-emergence tests were conducted with radish, cucumber, oats and rye grass seeds and the solutions of the said soil modifying agents applied by spraying prior to the sprouting of the seeds. The rates of application employed in these tests were one hundred pounds per acre and fifty pounds per acre, without indicating any herbicidal effects.

What we claim is:

1. Process for the treatment of soil containing insoluble iron compounds which comprises treating the soil with 8-hydoxy quinoline-5-sulfonic acid.

2. Process for the treatment of soil containing iron salts in an insoluble form which comprises treating the said soil with 8-hydroxy quinoline-5-sulfonic acid.

3. Process for the treatment of soil containing iron salts in an insoluble form which comprises treating the said soil with 8-hydroxy quinoline-5-sulfonic acid together with a soluble iron salt.

4. Process for the treatment of soil containing iron salts in an insoluble form which comprises treating the said soil with 8-hydroxy quinoline-5-sulfonic acid, the proportion of the said 8-hydroxy quinoline-5-sulfonic acid being from 2.5 to 50 pounds per acre.

5. Process for the treatment of soil containing iron salts in an insoluble form which comprises treating the said soil with 8-hydroxy quinoline-5-sulfonic acid, the proportion of the said 8-hydroxy quinoline-5-sulfonic acid being from 2.5 to 50 pounds per acre together with from 25 to 500 pounds of a soluble iron salt.

6. A soil-treating composition comprising as an essential component thereof a fertilizer containing compounds of nitrogen, potash, and phosphorus together with an 8-hydroxy quinoline-5-sulfonic acid.

References Cited in the file of this patent

UNITED STATES PATENTS

| | | |
|---|---|---|
| 2,284,002 | Lontz | May 26, 1942 |
| 2,661,276 | Schlesinger et al. | Dec. 1, 1953 |
| 2,678,314 | Taylor | May 11, 1954 |
| 2,692,822 | Denny | Oct. 26, 1954 |
| 2,828,182 | Cheronis | Mar. 25, 1958 |
| 2,833,640 | Bersworth | May 6, 1958 |

OTHER REFERENCES

Journal of the American Chemical Society, vol. 72, June 1950, page 2782.